(12) United States Patent
Gilardi et al.

(10) Patent No.: US 7,228,014 B2
(45) Date of Patent: Jun. 5, 2007

(54) SYSTEM FOR REDUCING THE ELECTRICAL RETURN LOSS OF A LITHIUM NIOBATE TRAVELING WAVE OPTICAL MODULATOR WITH LOW CHARACTERISTIC IMPEDANCE

(75) Inventors: Giovanni Gilardi, San Donato Milanese (IT); Paolo Milanese, San Donato Milanese (IT); Simone Pensa, San Donato Milanese (IT); Mario Bonazzoli, San Donato Milanese (IT); Luigi Gobbi, San Donato Milanese (IT)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 10/799,051

(22) Filed: Mar. 11, 2004

(65) Prior Publication Data

US 2005/0201653 A1    Sep. 15, 2005

(51) Int. Cl.
| | |
|---|---|
| G02F 1/035 | (2006.01) |
| G02F 1/295 | (2006.01) |
| G02F 1/03 | (2006.01) |
| G02B 6/12 | (2006.01) |
| G02B 6/255 | (2006.01) |

(52) U.S. Cl. .................. 385/8; 385/2; 385/8; 385/9; 385/14; 385/88; 385/89; 385/92; 359/245; 359/248; 359/249; 359/180; 359/188

(58) Field of Classification Search .............. 385/1–3, 385/8; 359/238–297, 315–320; 367/140–191
See application file for complete search history.

(56) References Cited

U.S. PATENT DOCUMENTS

| | | | |
|---|---|---|---|
| 5,123,065 A * | 6/1992 | Enochs .................... 385/9 |
| 5,208,697 A | 5/1993 | Schaffner et al. |
| 5,602,672 A * | 2/1997 | Ishimura et al. ............ 359/245 |
| 6,101,295 A * | 8/2000 | Mineo et al. ............... 385/1 |
| 6,323,986 B1 * | 11/2001 | Lee et al. .................. 359/248 |
| 6,437,899 B1 * | 8/2002 | Noda ....................... 359/245 |
| 2001/0038146 A1 * | 11/2001 | Shimizu .................... 257/728 |
| 2003/0063362 A1 * | 4/2003 | Demir et al. ............... 359/240 |
| 2003/0077054 A1 * | 4/2003 | Marazzi et al. ............. 385/92 |
| 2003/0183927 A1 * | 10/2003 | Kojima et al. ............. 257/728 |

(Continued)

FOREIGN PATENT DOCUMENTS

EP          0 629 892          12/1994

(Continued)

OTHER PUBLICATIONS

EP Search Report, Application No. EP05300174, dated Apr. 26, 2005.

*Primary Examiner*—Frank G. Font
*Assistant Examiner*—Erin Chiem
(74) *Attorney, Agent, or Firm*—Patterson & Sheridan, L.L.P.

(57) ABSTRACT

An electro-optical modulator is disclosed that has a microwave input, chip with a thin film resistor or a lumped resistor located between an input RF connector and an RF electrode on a Lithium Niobate chip. The accessory connection chip has a broadband attenuator like a thin film resistor which is placed in a microstrip line for effecting the electrical transmission to Lithium Niobate chip. The insertion of the thin film resistor before the RF electrode lowers the electrical return loss value as a function of frequency, allowing a lower driving voltage design or a reduced chip length without degrading the performances.

16 Claims, 7 Drawing Sheets

U.S. PATENT DOCUMENTS

2003/0235359 A1 * 12/2003 Geary et al. .................. 385/2

FOREIGN PATENT DOCUMENTS

| | | |
|---|---|---|
| EP | 1 308 769 | 5/2003 |
| GB | 2 305 511 | 4/1997 |
| JP | 2001257412 | 9/2001 |
| WO | WO 91/17470 | 11/1991 |

* cited by examiner

590

SYSTEM FOR REDUCING THE ELECTRICAL RETURN LOSS OF A LITHIUM NIOBATE TRAVELING WAVE OPTICAL MODULATOR WITH LOW CHARACTERISTIC IMPEDANCE

BACKGROUND INFORMATION

1. Technical Field of the Invention

The invention relates generally to the field of fiber optics and more particularly to electro-optical modulators.

2. Description of Related Art

Electro-optical modulators in a recent trend are moving toward conjugating smaller dimensions and lower driving voltages to enable system vendors to design their opto-electronic boards, e.g. transponders, by adopting smaller footprints, with inexpensive and low power electronic components. Conventional solutions employ three design techniques for reducing a RF driving voltage in a Lithium Niobate ("LN") travelling wave modulator: (1) adopting a longer RF electrode, and thus resulting in a longer, instead of a shorter, chip; (2) decreasing the buffer-layer thickness, resulting in an overall worsening of the performances; and (3) decreasing the gap width between hot and ground electrodes of the CoPlanar transmission line, resulting once more in an overall worsening of the performances.

Each of these three techniques has shortcomings. First, if the RF electrode is lengthened, the chip and package dimensions in turn must be lengthened. In addition, the total electrical losses increase, thereby decreasing the electro-optical bandwidth. Thus, such a solution is not suitable for designing metro application-oriented components. Second, if the buffer-layer thickness is decreased, the electro-optical bandwidth also decreases due to the total electrical losses increasing and microwave effective refractive index being more difficult to be matched to the optic. Furthermore, the characteristic impedance of the microwave lines becomes worse, rendering more difficult to have a good electrical return loss vs. frequency profile. A good impedance matching between the driver output port and the modulator input port is desirable for a correct working of the entire transmission chain. A typical specification for the electrical return loss of the modulator (S11 parameter) is <−10 dB over the whole operating bandwidth. Third, if the gap width is decreased between hot and ground electrodes of the CoPlanar transmission line, the electro-optical bandwidth decreases due to the increasing in total electrical losses, while the characteristic impedance of the microwave lines becomes worse. A graphical diagram 100 in FIG. 1 illustrates typical profiles of S11 parameters versus frequency for a standard x-cut modulator, which shows values well below the required specification, i.e. −10 dB.

Accordingly, there is a need to design a system for reducing the electrical return loss of Lithium Niobate traveling wave electro-optical modulators with low characteristic impedance.

SUMMARY OF THE INVENTION

The present invention overcomes the foregoing problems by providing an electro-optical modulator that has a microwave thin film resistor (or a lumped resistor) on an accessory connection chip located between the RF connector of the microwave input and the RF electrode of the Lithium Niobate chip. The accessory connection chip has a broadband attenuator, such as a thin film resistor, which is placed in a microstrip line to ensure that the electrical transmission reaches the Lithium Niobate chip. The insertion of the thin film resistor before the RF electrode lowers the electrical return loss, allowing a lower driving voltage design or a reduced chip length.

An electro-optical modulator comprises a modulator chip having a low impedance; and a microwave input chip, coupled to the modulator chip, having a resistor with a low impedance for increasing the total impedance at the input RF connector.

Advantageously, the present invention improves the overall performance of a modulator by designing a low impedance RF electrode and using an accessory chip with a thin film resistor, thereby producing a lower driving voltage with the same electrode length and electro-optical bandwidth or a low impedance RF electrode having a reduced length that produces the same performance in terms of driving voltage but with a larger electro-optical bandwidth relative to a standard solution. The thin film resistor in the accessory chip also facilitates the attaining of the necessary electrical return loss for low impedance RF lines.

Other structures and methods are disclosed in the detailed description below. This summary does not purport to define the invention. The invention is defined by the claims.

DETAILED DESCRIPTION OF PREFERRED EMBODIMENT(S)

Figure 1:
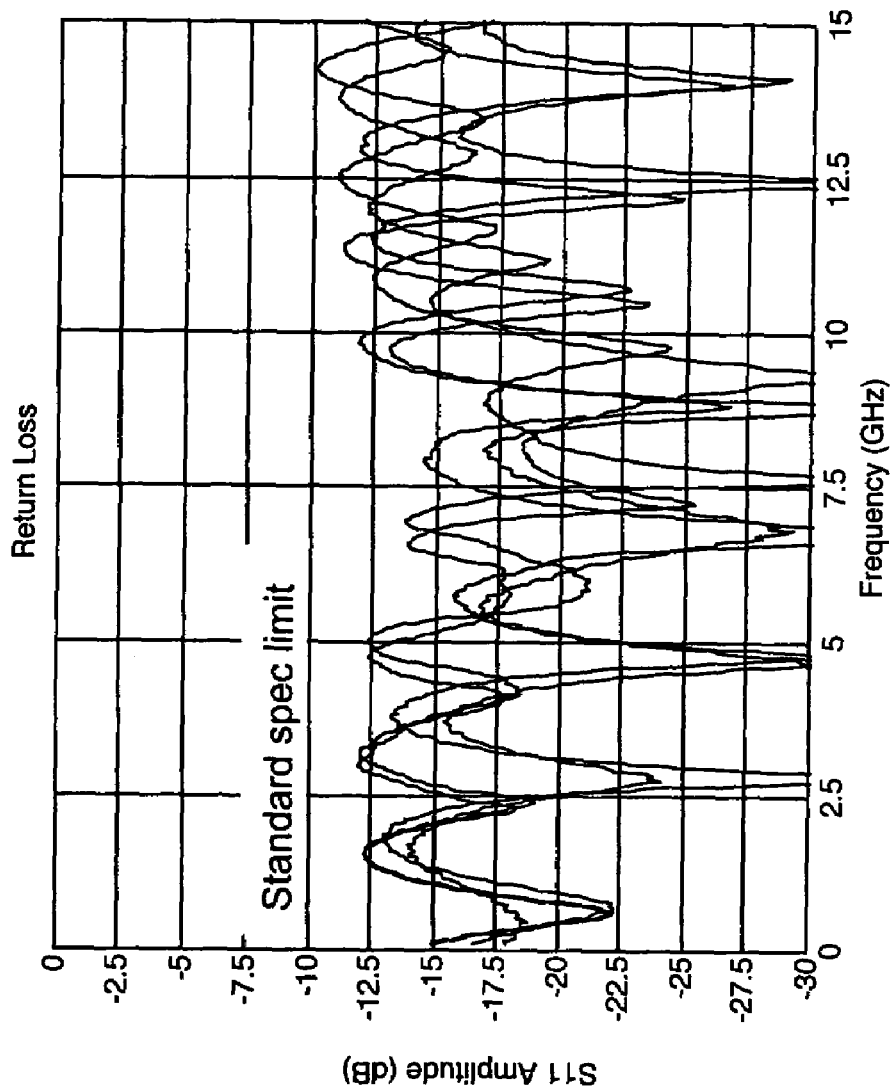
FIG. 1 is a prior art graphical diagram illustrating typical profiles of S11 parameters versus frequency for a standard x-cut modulator.
Figure 2:
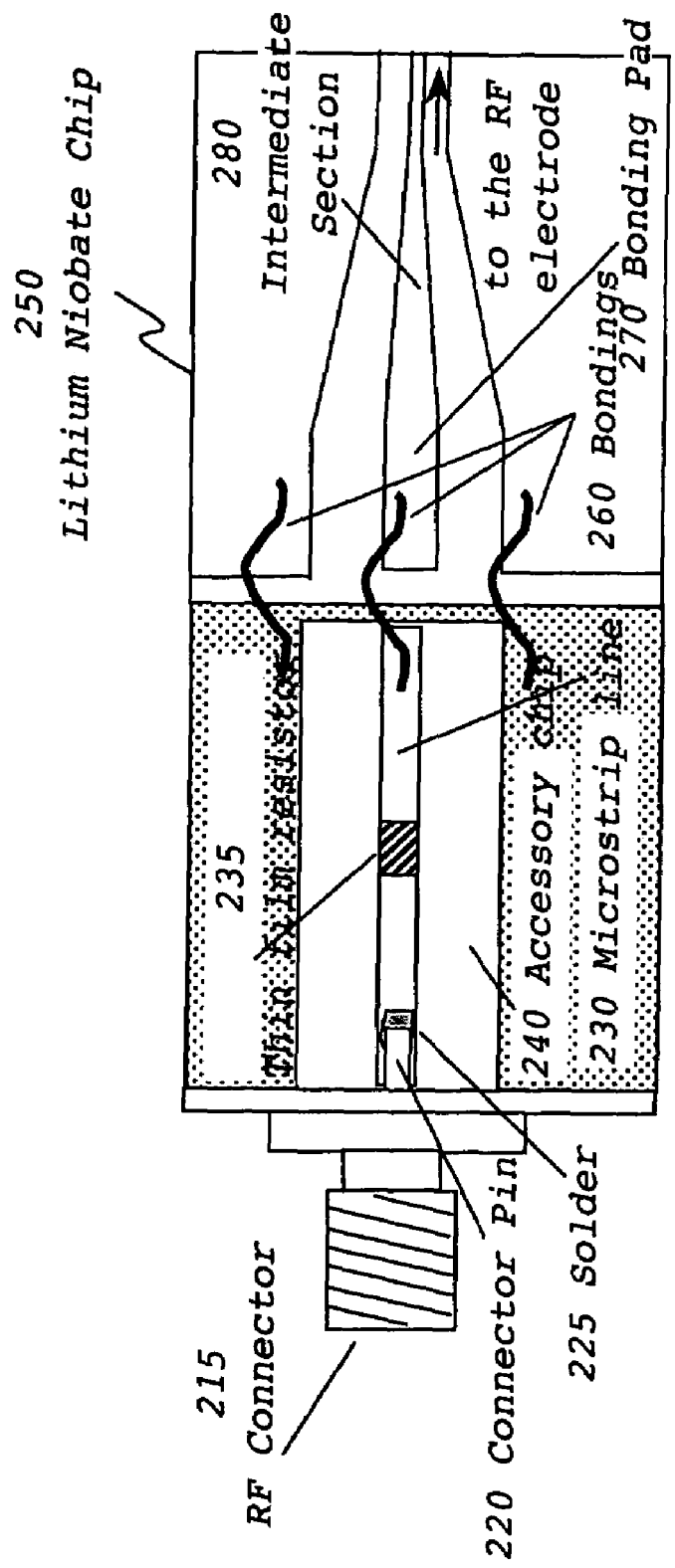
FIG. 2 depicts a structural diagram illustrating the RF input section of an electro-optical modulator with a RF electrical circuit employing a thin resistive film in accordance with the present invention.

Referring now to FIG. 2, there is shown a structural diagram illustrating an electro-optical modulator 200 with a RF electrical circuit employing a thin resistive film in accordance with the present invention. The electro-optical modulator 200 comprises a microwave input chip or an accessory chip 240, which is coupled to the Lithium Niobate chip 250 through one or more wire bondings 260, ribbons, soldering, or dots of resin. In order to ease bonding adhesion, one or more of bonding pads 270 are placed on the Lithium Niobate chip 250, with a tapered impedance-controlled structure connecting the one or more bonding pads 270 to the modulating RF line positioned near the optical waveguides.

The accessory chip 240 has a broadband attenuator, such as a thin film resistor 235, for connecting a RF connector 215 to a RF line or an intermediate section to the RF electrode 280 of the Lithium Niobate chip 250. A microwave path in the microstrip line 230 could be interrupted in a relatively small section so that a conductor could be replaced by the thin resistive film 235. A typical microwave path is a 50 Ohm line, selected to match the connector impedance, while the tapered portion on the Lithium Niobate chip 250 is designed to adapt the characteristic impedance of the modulating line (about 30–36 Ohm for x-cut modulators and about 40–45 Ohm for z-cut modulators).

The microwave transition from the external RF connector 215 to an intermediate section to the RF electrode 280 can be accomplished by an accessory chip 240. A suitable external RF connector is a SMA, K, GPO type of connector or other types of connector like pin or butterfly solution, depending on the targeted frequency and selected application. The accessory chip 240 can be made of Alumina, Gallium Arsenide, Aluminum Nitride or other type of substrates commonly used for microwave applications.

A microwave line is shown as a straight microstrip line 230 for illustration purposes. One of skill in the art should recognize that other type of transmission lines (e.g., coplanar waveguide), as well as hybrid solutions where a first section is a microstrip line and a second section is a coplanar waveguide, can be practiced without departing from the spirits of the present invention. A curved path, rather than a straight microstrip line, can also be implemented.

In this embodiment, the thin film resistor 235 is selected of a few Ohm resistance, e.g. 1–10 Ohms. The low Ohm resistance of the thin film resistor 235 produces a limited effect on the electrical transmission such that the performance degradation does not exceed 0.1 dB per Ohm.

Although the driving voltage undergoes a performance degradation due to the resistive partition between the thin film resistance and the resistive load placed at the end of the RF line, this effect is negligible. Typically, a 50 mV per Ohm increase in the driving voltage is expected for driving voltages about 5V and resistive loads ranging from 20 to 30 Ohms.

To obtain the resistance values as discussed above in hundreds of micrometers in length and width, and 1–5 micrometers thick, the physical dimension of the thin film matches well with the dimension of the coplanar waveguide or microstrip line on a substrate commonly adopted for the accessory chip 240.

Table 1 shows the parameters obtained in comparing the electro-optical and microwave performance of a: standard modulator package to an electro-optical modulator with low impedance of the present invention. In particular, the electro-optical modulator with the low impedance produces a lower driving voltage with an electrode length that is the same as the standard modulator, while the total electrical losses for both the electro-optical modulator with the low impedance and the standard modulator are comparable. Alternatively, the RF electrode length can be shorten to obtain the same driving voltage as the standard modulator, which results in a device with an even better electro-optical bandwidth.

The nomenclature for the symbols adopted in Table 1 is briefly described as follows:

$t_{gold}$: electroplated gold thickness
$N_m$: effective microwave refractive index
(to be compared to the effective refractive index of the guided optical mode $N_{opt}$~2.14)
$Z_0$ [_]: characteristic impedance of the RF electrode line
$\alpha$ [dB/cm]: electrical losses per cm @ 12.5 GHz
$V_\pi\_L$ [V_cm]: driving voltage of a 0.10 mm-long reference RF electrode
L [cm]: RF electrode length
$V_\pi$ [V]: driving voltage of a RF electrode of length L
$\alpha\_L$ [dB]: total electrical losses @ 12.5 GHz of a RF electrode of length L In addressing the decrease in a buffer-layer thickness and the decrease in the gap width between hot and ground electrodes of the CoPlanar transmission line, the total electrical losses can be reduced effectively by raising the electroplated gold electrode thickness ranging from 20 to 30 micrometers, which also has a positive effect on the microwave and optical effective refractive index matching. It is noted however, that by increasing the electrode gold thickness, the characteristic impedance could become lower, causing S11 parameter profile to exceed the required specification.

Nevertheless, the techniques in decreasing a buffer-layer thickness and the gaps between hot and ground electrodes of the CoPlanar transmission line could be used in order to design a traveling wave modulator with a low driving voltage, provided that the electroplated electrode thickness is increased in countering the increased electrical losses and an approach to contrast the mismatch between the low impedance modulator RF line and the driver amplifier is used. One way to contrast the mismatch is to place a broadband attenuator before the RF electrode. The S11 parameter profile can be adjusted to obtain the desired specification, if such element has a marginal effect on other parameters of a modulator, such as the electro-optical response. The broadband attenuator can be designed with a thin film resistor, placed on the accessory chip between the RF connector and the Lithium Niobate RF electrode.

Figure 3:
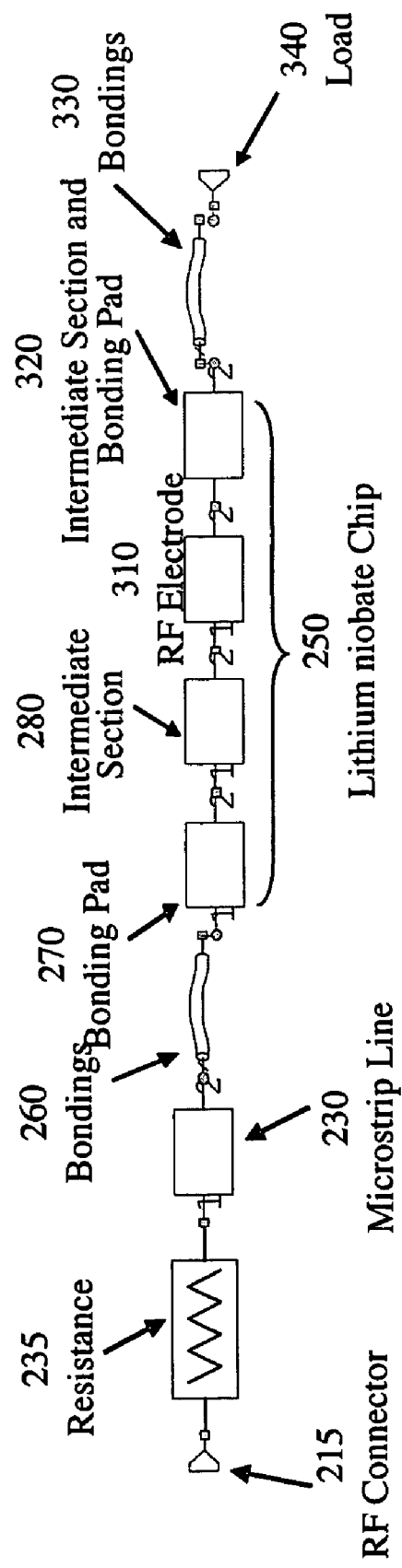
FIG. 3 depicts a structural diagram illustrating a simulation modeling circuit of the electro-optical modulator in accordance with the present invention.

FIG. 3 depicts a structural diagram illustrating a simulation modeling circuit 300 of an electro-optical modulator in accordance with the present invention. For modeling purposes, additional circuits are concatenated to the input section of the electro-optical modulator 200 that include an RF electrode 310, an intermediate section and bonding pad 320, one or more bondings 330, and a load 340.

Figure 4:
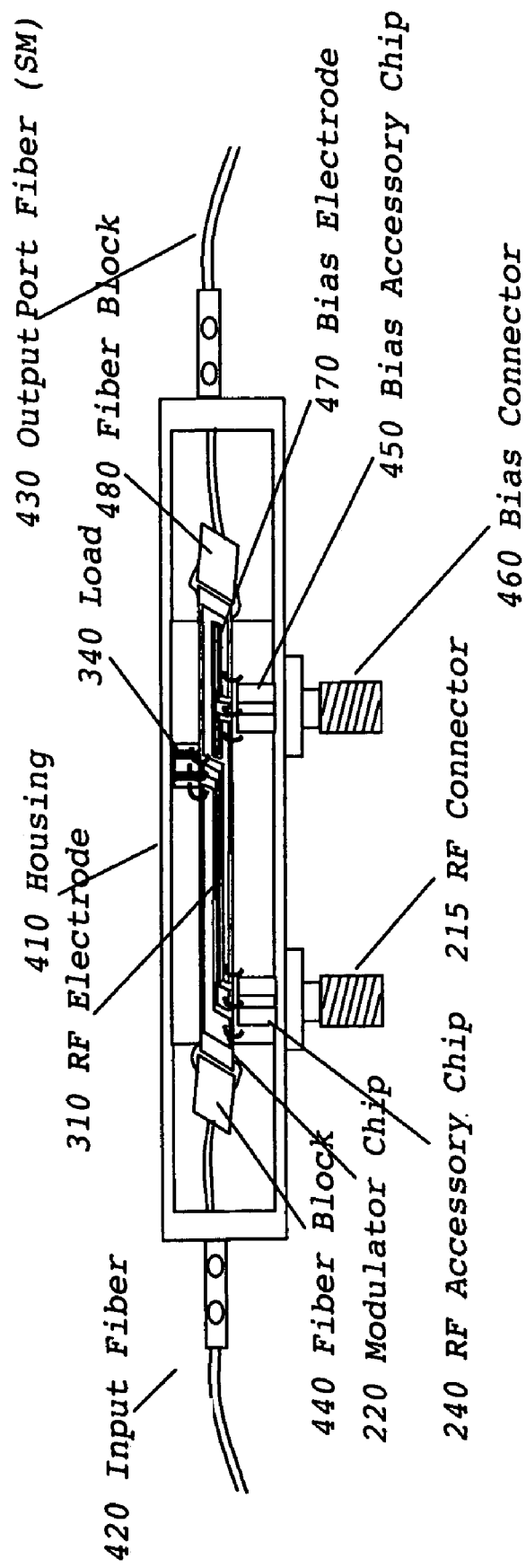
FIG. 4 depicts a structural diagram illustrating a packaged modulator in accordance with the present invention.

Turning now to FIG. 4, there is shown a structural diagram illustrating a packaged modulator 400 in accordance with the present invention. A modulator housing 410 has an input fiber 420 and an output fiber 430 on each end of the modulator housing 410. The input fiber 420 is connected to a fiber block 440, which in turn connects to the modulator chip 250. The modulator chip has several more couplings, which connects to the microwave input chip 210 and the RF connector 215, as well as connecting to the RF electrode 310 and the load 340. A bias accessory chip 450 is introduced as part of the packaged modulator 400 by connecting to a bias connector 460 on a first side and connecting to a bias electrode 470 on a second side. The modulator chip 250 further connects to a fiber block 480 for generating an output signal to the output fiber 430.

TABLE 1

| Release | $t_{gold}$ | $N_m$ | $Z_0$ [_] | $\alpha$ [dB/cm] | $V_\pi\_L$ [V_cm] | L [cm] | $V_\pi$ [V] | $\alpha\_L$ [dB] |
|---|---|---|---|---|---|---|---|---|
| Standard | 20 | 2.20 | 36.5 | 1.74 | 12.9 | 3.1 | 4.17 | 5.4 |
| Low Imped. (L11) | 24 | 2.22 | 28.1 | 1.72 | 9.7 | 3.1 | 3.16 | 5.3 |

Figure 5A:
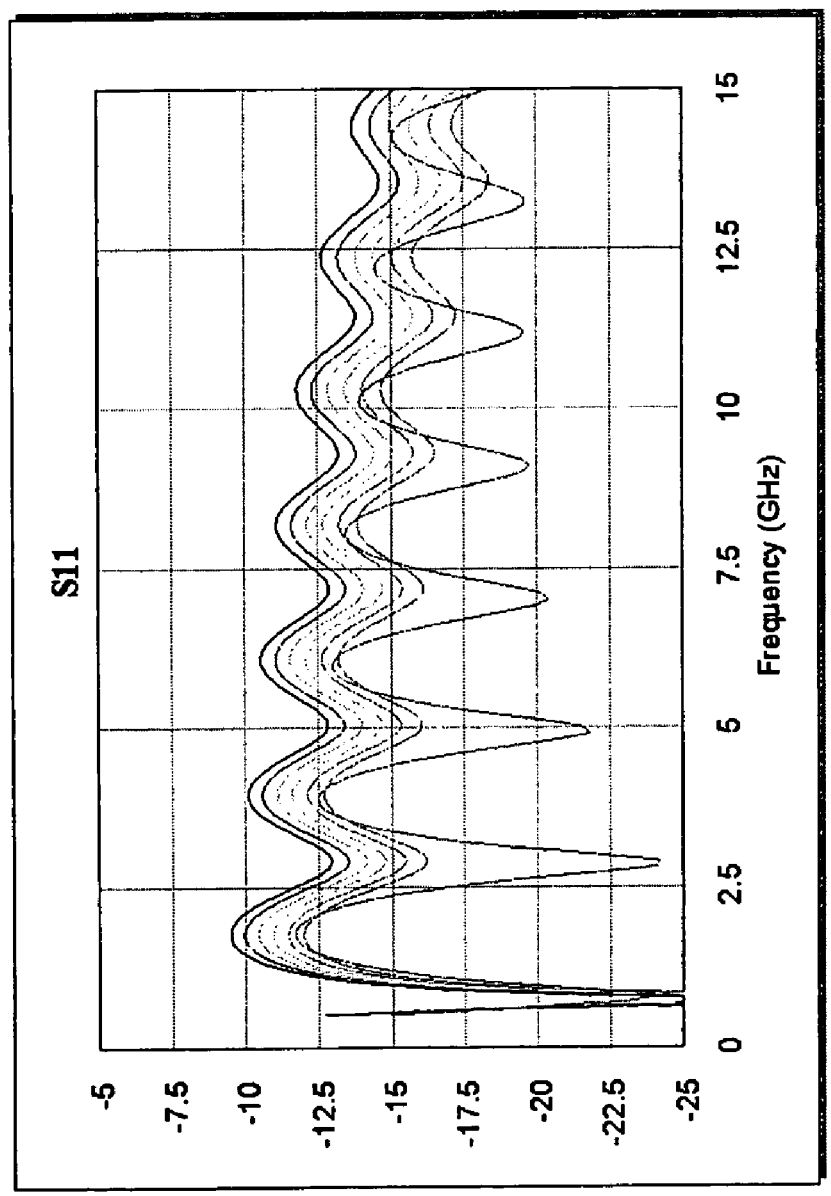
FIGS. 5A–5C depict graphical diagrams illustrating the waveforms of S11 and S21 characteristics in accordance with the present invention.
Figure 5B:
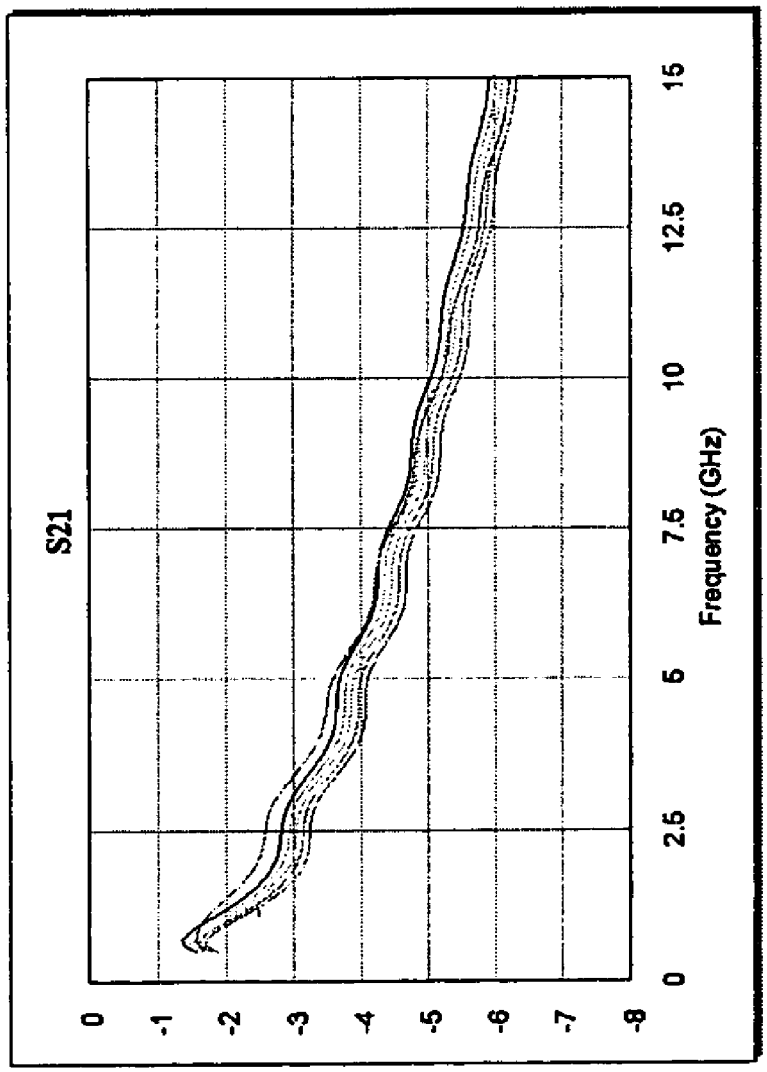
Figure 5C:
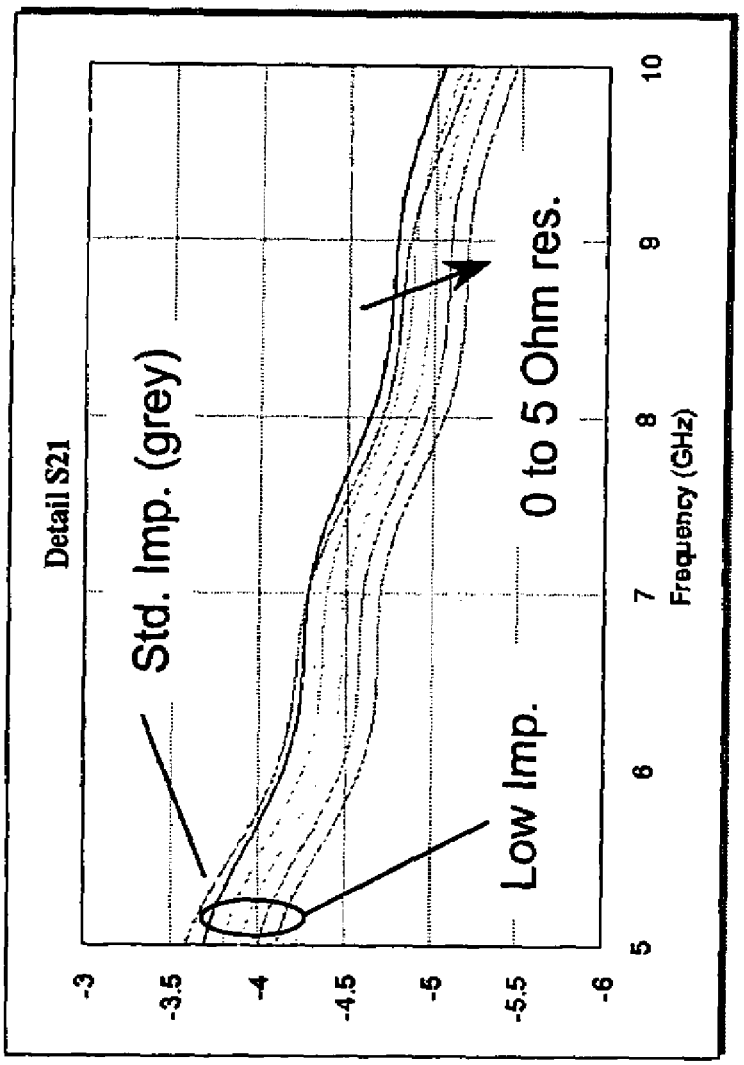

FIGS. 5A–5C depict graphical diagrams illustrating waveforms of S11 and S21 characteristics of a modulator in accordance with the present invention. In FIG. 5A, there is a graphical diagram 500 illustrating S11 parameters profile with the thin film resistor 235 with a structure L11 as shown in FIG. 2. If a higher resistance value is selected for the thin film resistor 235, the electrical return loss peaks will be lowered, resulting in an even better S11 profile. For the L11 structure, a 4 Ohm resistance is sufficient to reach the same S11 level of a standard structure. FIG. 5B in graphical diagram 550 and 5C in graphical diagram 590 demonstrate the effect on the electrical transmission (and as a consequence on both the electro-optical response and the driving voltage) which leads to a minimal penalizing degradation.

The present invention provides a structure for a reduction of several millimeters, for example 5–8 millimeters, on the total chip length, which in turn reduces the total length on a device. In addition, when maintaining the same electrode length, the operating driving voltage decreases about, for example, 10–20% relative to standard solutions, that allows the adoption of lower power consumption RF driver amplifiers. These improvements are attractive features in the design of optical modulators with metro-oriented performance, as well as local networks, long-haul networks and ultra-long-haul networks. For example, a suitable application of the present invention is the Ultra Small Form Factor $LiNbO_3$ electro-optical modulator for a metro application.

Although the above embodiment illustrates the insertion of a resistive element on the accessory input chip as a thin film, one of ordinary skill in the art should recognize the principles in the present invention can be extended to the usage of a lumped resistance, with the same performance, provided that such an element is placed in the same position with reference to the equivalent electrical circuit, as shown in the schematic circuit of FIG. 3.

It is apparent to one of skill in the art that other type of electro-optical modulators can be used which is not necessary a Lithium Niobate modulator or not a $LiNbO_3$ substrate. The resistive element (i.e., the thin film resistor 235) can be placed, other than at or near the center of the microwave path, at any location along the microwave path.

Those skilled in the art can now appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications, whether explicitly provided for by the specification or implied by the specification, will become apparent to the skilled practitioner upon a study of the drawings, specification, and following claims.

We claim:

1. An electro-optical modulator, comprising:
   a housing with an input fiber at one end and an output fiber at another end thereof, wherein the fibers are connected to the housing along substantially the same axis;
   a Lithium Niobate chip having a low impedance and an RF electrode;
   a microwave input chip coupled to the modulator chip, the microwave input chip having a thin film resistor for connecting a RF connector to the RF electrode of the Lithium Niobate chip, wherein the RF connector is positioned in the housing such that the RF connector is substantially perpendicular to the axis of the fibers and the microwave input chip is configured to increase the total input impedance of the modulator; and
   a coplanar waveguide in the microwave input chip, the thin film resistor being placed in the coplanar waveguide.

2. The electro-optical modulator of claim 1, further comprising a plurality of bondings for coupling the microwave input chip to the modulator chip.

3. The electro-optical modulator of claim 1, wherein the microwave input chip is manufactured with a substrate of Alumina, Gallium Arsenide, Aluminum Nitride or other type of substrates commonly used for microwave applications.

4. An electro-optical modulator, comprising:
   a housing;
   an input fiber connected to an end of the housing and an output fiber connected to another end of the housing, the fibers connected to the housing along substantially the same axis;
   a RF connector connected to the housing such that the RF connector is substantially perpendicular to the axis of the fibers;
   a modulator chip having a low impedance and an RF electrode, wherein the modulator chip is optically connected to the input fiber and the output fiber; and
   a microwave input chip coupled to the modulator chip, the microwave input chip having a resistor member comprising a thin film resistor with a low impedance for increasing the total input impedance of the modulator, the thin film resistor connects the RF connector to the RF electrode of the modulator chip.

5. The electro-optical modulator of claim 4, wherein the thin film resistor comprises a lumped resistance.

6. The electro-optical modulator of claim 4, wherein the modulator chip is a Lithium Niobate chip.

7. The electro-optical modulator of claim 4, further comprising a microstrip line or coplanar line in the microwave input chip, the thin film resistor being placed in the microstrip line.

8. The electro-optical modulator of claim 7, wherein the microstrip line is a straight line.

9. The electro-optical modulator of claim 4, further comprising a coplanar waveguide in the microwave input chip, the thin film resistor being placed in the coplanar waveguide.

10. The electro-optical modulator of claim 7, wherein the microstrip line is curved.

11. The electro-optical modulator of claim 4, wherein the microwave input chip is manufactured with a substrate of Alumina, Gallium Arsenide, Aluminum Nitride or other type of substrates commonly used for microwave applications.

12. The electro-optical modulator of claim 1, wherein the thin film resistor is positioned between the RF connector and the RF electrode such that an electrical return loss is lowered which results in the Lithium Niobate chip having a reduced length.

13. The electro-optical modulator of claim 4, wherein the thin film resistor is positioned between the RF connector and the RF electrode such that an electrical return loss is lowered which results in a lower driving voltage relative to a standard modulator.

14. An electro-optical modulator, comprising:
   a housing with an input fiber at one end and an output fiber at another end thereof, wherein the fibers are aligned in the housing along substantially the same axis;
   a modulator chip optically connected to the input fiber and the output fiber, the modulator chip includes an RF electrode;
   the RF connector connected to the modulator chip, wherein the RF connector is positioned such that the RF connector is substantially perpendicular to the axis of the fibers; and
   a RF accessory chip coupled to the modulator chip, the RF accessory chip having a resistor member comprising a thin film resistor with a low impedance for increasing the total input impedance of the modulator chip, wherein the thin film resistor connects the RF connector to the RF electrode of the modulator chip.

15. The electro-optical modulator of claim 14, wherein the thin film resistor is positioned between the RF connector and the RF electrode such that an electrical return loss is lowered which results in the modulator chip having a reduced length.

16. The electro-optical modulator of claim 15, further including a bias connector, wherein the bias connector is connected to the housing such that the bias connector is substantially parallel to the RF connector.

* * * * *